United States Patent
Selly et al.

(10) Patent No.: US 11,407,338 B2
(45) Date of Patent: Aug. 9, 2022

(54) CHILD SAFETY RESTRAINT SYSTEM

(71) Applicant: Selly Industries LLC, Memphis, TN (US)

(72) Inventors: Brett Tyson Selly, Memphis, TN (US); KaLeigh Brett Selly, Memphis, TN (US)

(*) Notice: Subject to any disclaimer, the term of this patent is extended or adjusted under 35 U.S.C. 154(b) by 0 days.

(21) Appl. No.: 17/223,082

(22) Filed: Apr. 6, 2021

(65) Prior Publication Data
US 2021/0291704 A1  Sep. 23, 2021

Related U.S. Application Data

(63) Continuation of application No. 16/221,243, filed on Dec. 14, 2018, now abandoned.

(60) Provisional application No. 62/578,335, filed on Dec. 15, 2017.

(51) Int. Cl.
| | |
|---|---|
| *B60N 2/28* | (2006.01) |
| *A45F 4/02* | (2006.01) |
| *A45F 3/04* | (2006.01) |

(52) U.S. Cl.
CPC ............ *B60N 2/286* (2013.01); *A45F 3/04* (2013.01); *A45F 4/02* (2013.01); *A45F 2004/026* (2013.01)

(58) Field of Classification Search
CPC ........ A45F 4/02; A45F 3/04; A45F 2004/026; B60N 2/286; B60N 2/2851; B60N 2/28
See application file for complete search history.

(56) References Cited

U.S. PATENT DOCUMENTS

| | | | | |
|---|---|---|---|---|
| 5,573,155 | A | * | 11/1996 | Sadler ............... A45F 4/02 224/155 |
| 5,819,999 | A | * | 10/1998 | Tennant ............ A47C 4/52 224/155 |
| 7,229,132 | B2 | * | 6/2007 | Meeker ............ B60N 2/2806 297/250.1 |
| 7,303,230 | B2 | * | 12/2007 | Munn ................ B60N 2/20 297/255 |
| 7,380,878 | B2 | | 6/2008 | Clement et al. |
| 7,475,941 | B2 | | 1/2009 | Clement et al. |
| 7,845,726 | B2 | | 12/2010 | Mendenhall |
| 8,579,369 | B2 | | 11/2013 | Gaudreau, Jr. et al. |
| 9,108,543 | B1 | | 8/2015 | Knapp |
| 2004/0074937 | A1 | | 4/2004 | Thomas |
| 2005/0168026 | A1 | * | 8/2005 | Kau ................... A45C 15/00 297/256.16 |
| 2008/0061093 | A1 | * | 3/2008 | Pottharst ........... A45C 15/00 224/155 |
| 2010/0252589 | A1 | * | 10/2010 | Popescu ............ A45F 4/02 224/155 |
| 2010/0301078 | A1 | * | 12/2010 | Tamir ................ A45F 4/02 224/155 |

* cited by examiner

*Primary Examiner* — Milton Nelson, Jr.

(57) ABSTRACT

A portable child safety restraint system is provided. The portable child safety restraint system includes a child safety seating system and a backpack. The child safety seating system includes a seat bottom that is connected to a seat back such that the seat bottom is rotatable from an open position to a closed position. The child safety seating system is entirely removable from the backpack or permanently secured to or within at least one enclosure of the backpack. A method of securing a child in a portable child safety restraint system is also provided.

8 Claims, 21 Drawing Sheets

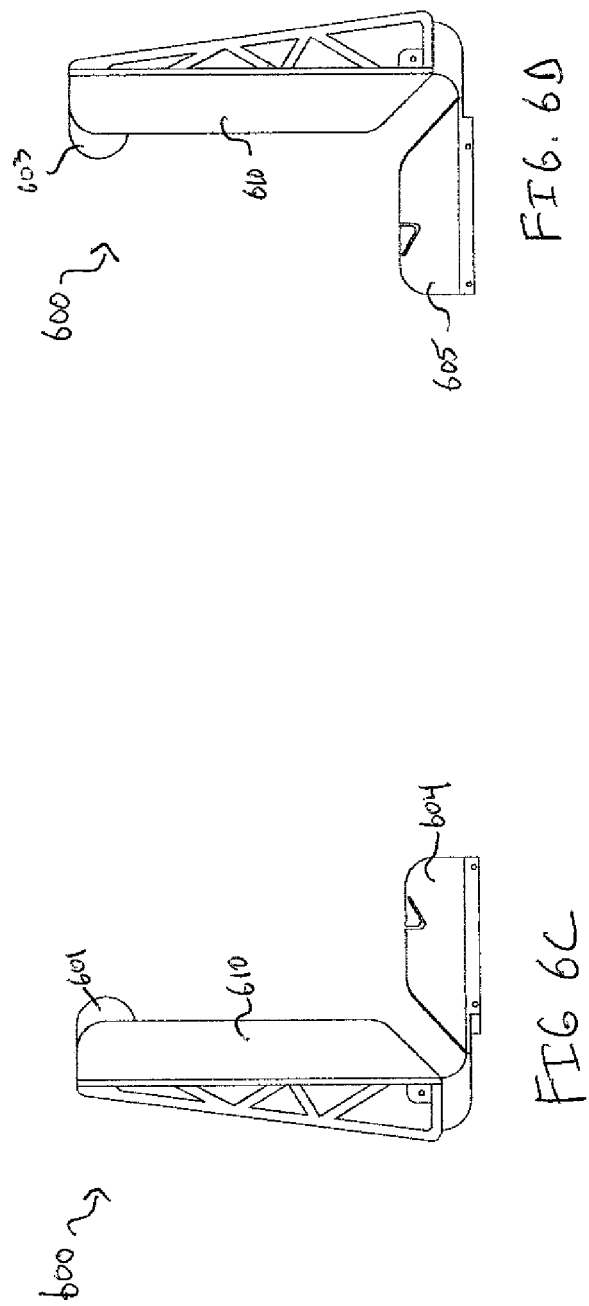

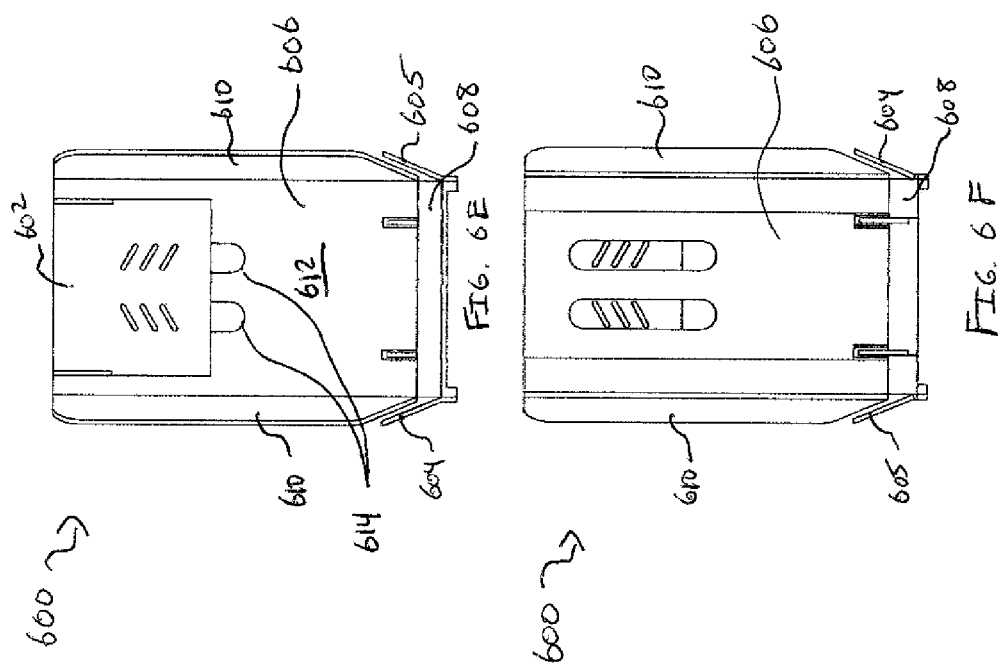

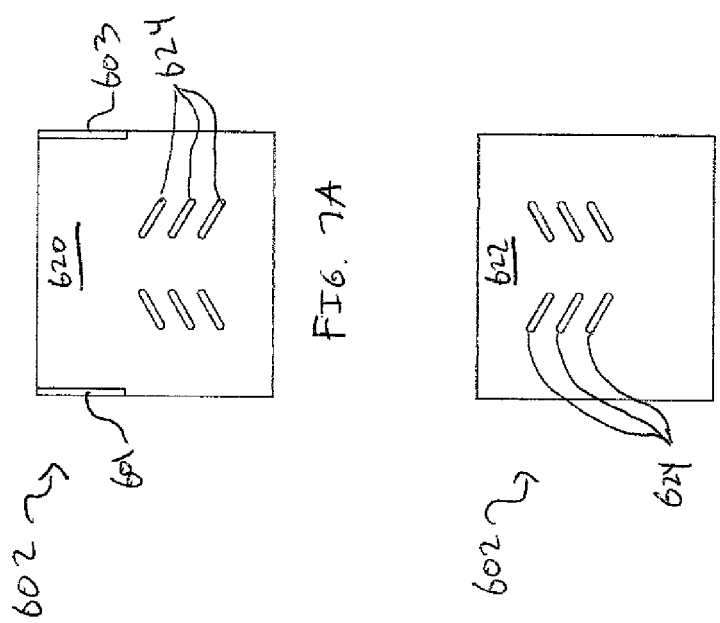

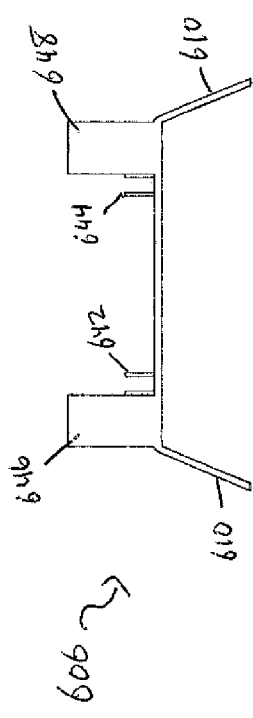
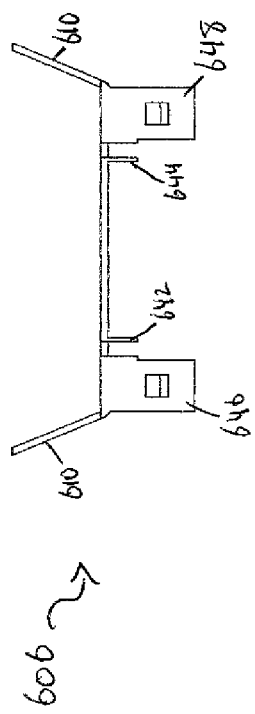

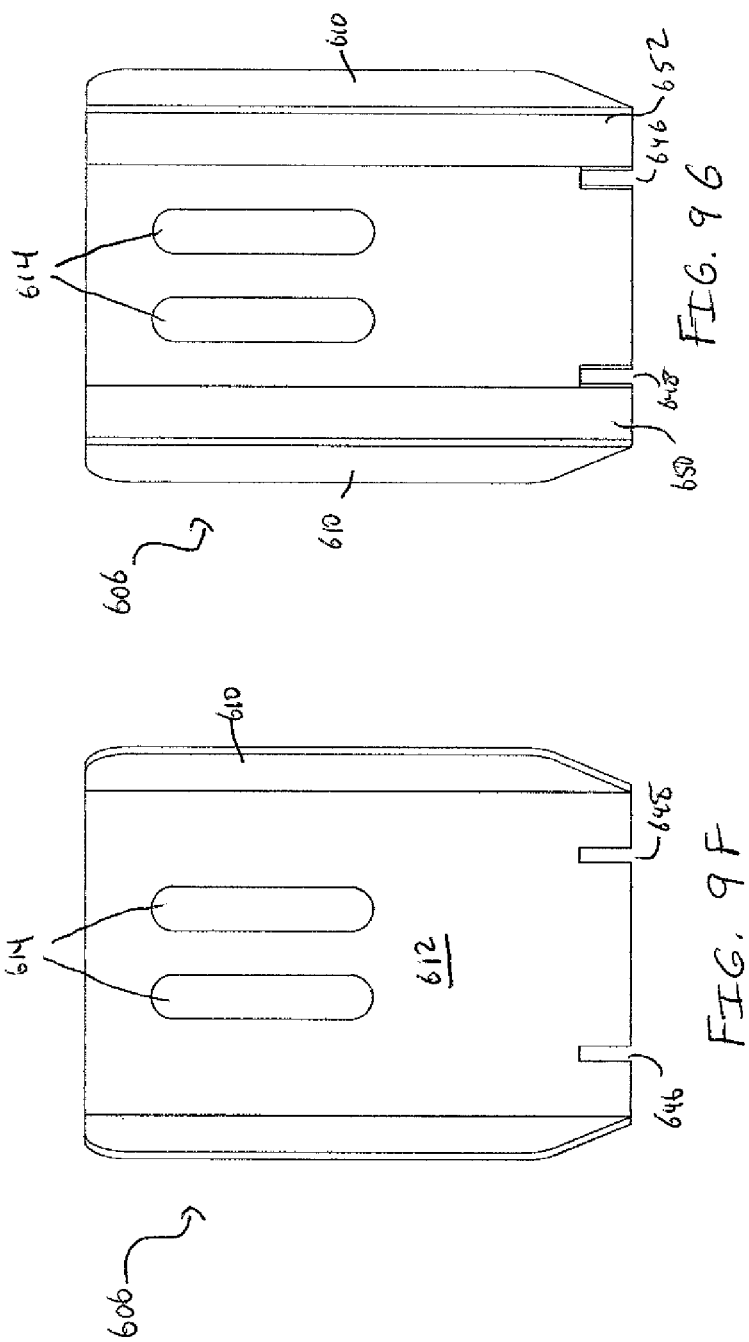

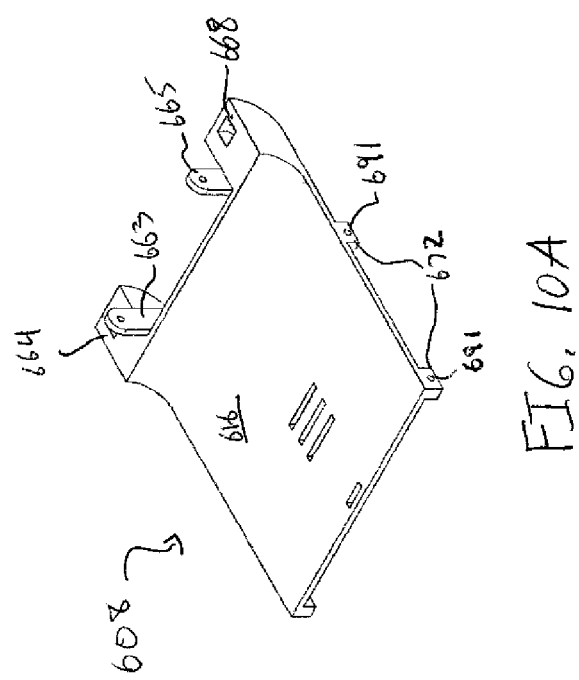

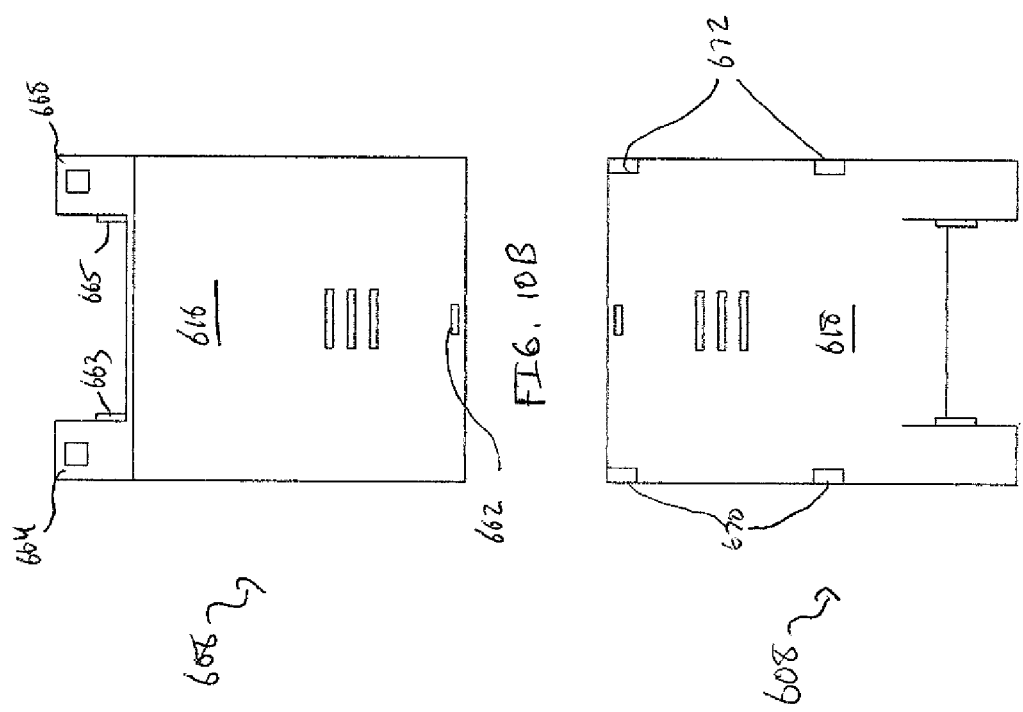

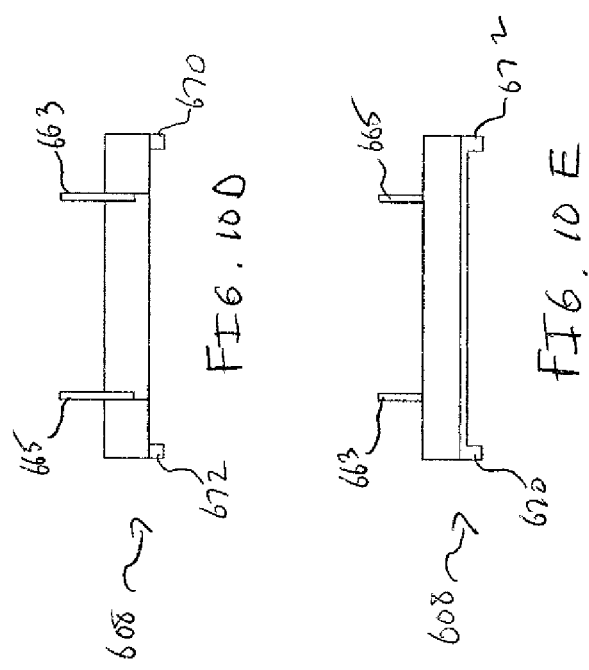

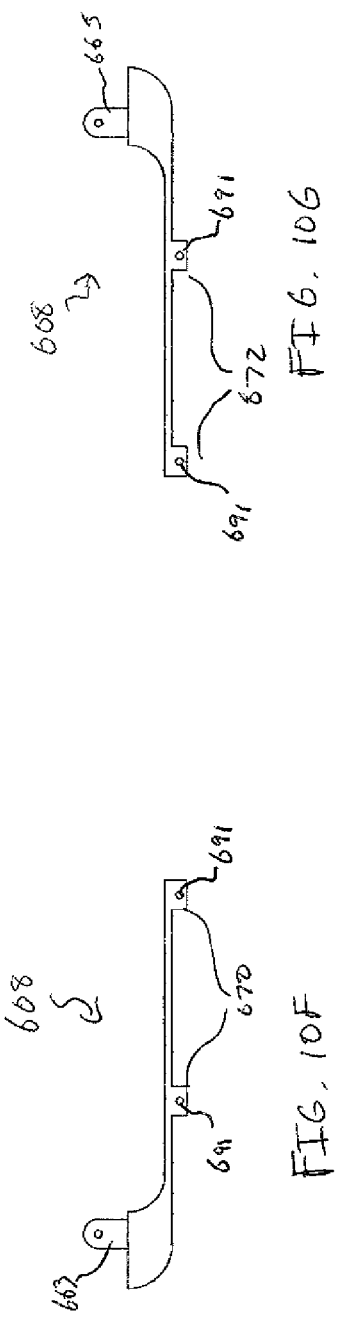

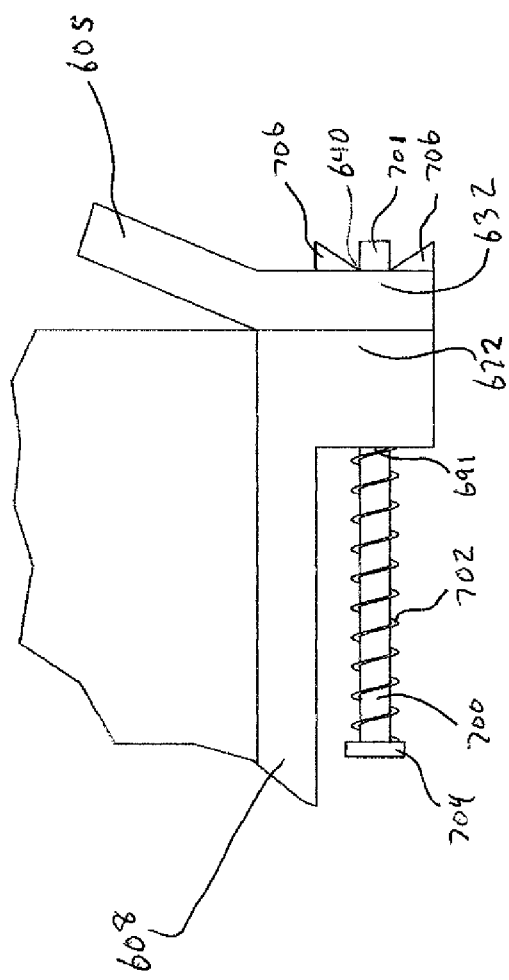

CHILD SAFETY RESTRAINT SYSTEM

CROSS-REFERENCE TO RELATED APPLICATIONS

This application is a continuation of U.S. Ser. No. 16/221,243 filed Dec. 14, 2018 which claims priority to U.S. Provisional Patent Application No. 62/578,335 filed Dec. 15, 2017, the contents of which are each incorporated herein in their entirety.

BACKGROUND OF THE INVENTION

Many active families intend to take their children with them everywhere more than ever before. Parents are limited in their ability to maintain safety within vehicles when they are not in their main vehicle and are forced to move a heavy and cumbersome child seat from one vehicle to another. Current car seat designs are bulky and difficult to travel with. Products exist to enclose full sized seats in "shoulder strap carrying cases" but these do not condense into more easily carried sizes or limit the difficulty of traveling with these seats. There is no current mobile seat on the market which creates ease of travel and incorporates storage functionality.

SUMMARY OF THE INVENTION

A child safety restraint system is provided. The portable child safety restraint system includes a child safety seating system comprising a seat bottom that is connected to a seat back and a backpack including a plurality of enclosures. The seat bottom is rotatable from a first, open position to a second, closed position. The child safety seating system is entirely removable from the backpack or permanently secured to or within at least one enclosure of the backpack. According to one embodiment, the seat back includes a right male latch component and left male latch component that each form a locking component having a transversely extending slot adapted to engage and secure to a bracket in each of a corresponding right female latch component and left female latch component located on or within the seat bottom. According to one embodiment, the seat back includes a front surface and back surface defining a plurality of slots. According to one embodiment, the child safety seating system is convertible between a rear-facing orientation and forward-facing orientation. According to one embodiment, the child safety seating system further comprises a left hip support component and right hip support component that are each rotatable from a first, open position to a second, closed position to allow the seat bottom to be folded up and in a parallel position with the seat back. According to one embodiment, the left hip support component and right hip support component each include a surface defining at least one seat belt guide slot. According to one embodiment, the child safety seating system further comprising a head support component that includes a right and left support flange to support a child's head. According to one embodiment, the head support component further comprises a front and back surface that define a plurality of slots that traverse the head support. According to one embodiment, the seat bottom comprises a right male hinge component and a left male hinge component adapted to engage and secure to each of a corresponding right female hinge component and a left female hinge component on the seat back. According to one embodiment, the plurality of enclosures is opened or closed via at least one zipper. According to one embodiment, the backpack includes one or more straps for holding the entire portable child safety restraint system.

According to another aspect, a method of securing a child in a portable child safety restraint system is provided. The method includes the steps of providing a portable child safety restraint system as provided herein, removing the child safety seating system from the backpack or opening a backpack enclosure that stores the child safety seating system, lowering the seat bottom from a closed position to an open position, opening each of a left and right hip support components rotateably attached to the seat bottom, introducing the child to the child safety seating system, and adjusting any harness system present in the child safety seating system.

DESCRIPTION OF THE DRAWINGS

FIG. 6C illustrates a right side view of a child safety seating system in an open position.

FIG. 6D illustrates a left side view of a child safety seating system assembly in an open position.

FIG. 6E illustrates a front view of a child safety seating system in an open position.

FIG. 6F illustrates a back view of a child safety seating system in an open position.

FIG. 7A illustrates a front view of a head support component.

FIG. 7B illustrates a rear view of the head support component.

FIG. 8A illustrates a side view of a left hip support component.

FIG. 8B illustrates a side view of a right hip support component.

FIG. 9A illustrates a top view of a seat back component.

FIG. 9B illustrates a bottom view of a seat back component.

FIG. 9F illustrates a front view of a seat back component.

FIG. 9G illustrates a back view of a seat back component.

FIG. 10A illustrates a perspective view of a seat bottom component.

FIG. 10B illustrates a top view of a seat bottom component.

FIG. 10C illustrates a bottom view of a seat bottom component.

FIG. 10D illustrates a back view of a seat bottom component.

FIG. 10E illustrates a front view of a seat bottom component.

FIG. 10F illustrates a right side view of a seat bottom component.

FIG. 10G illustrates a left side view of a seat bottom component.

FIG. 12 illustrates the front right corner of a particular embodiment of a child safety seating system. The illustrated corner may be repeated for all four corners of the child safety seating system.

DETAILED DESCRIPTION OF THE INVENTION

Figure 1:
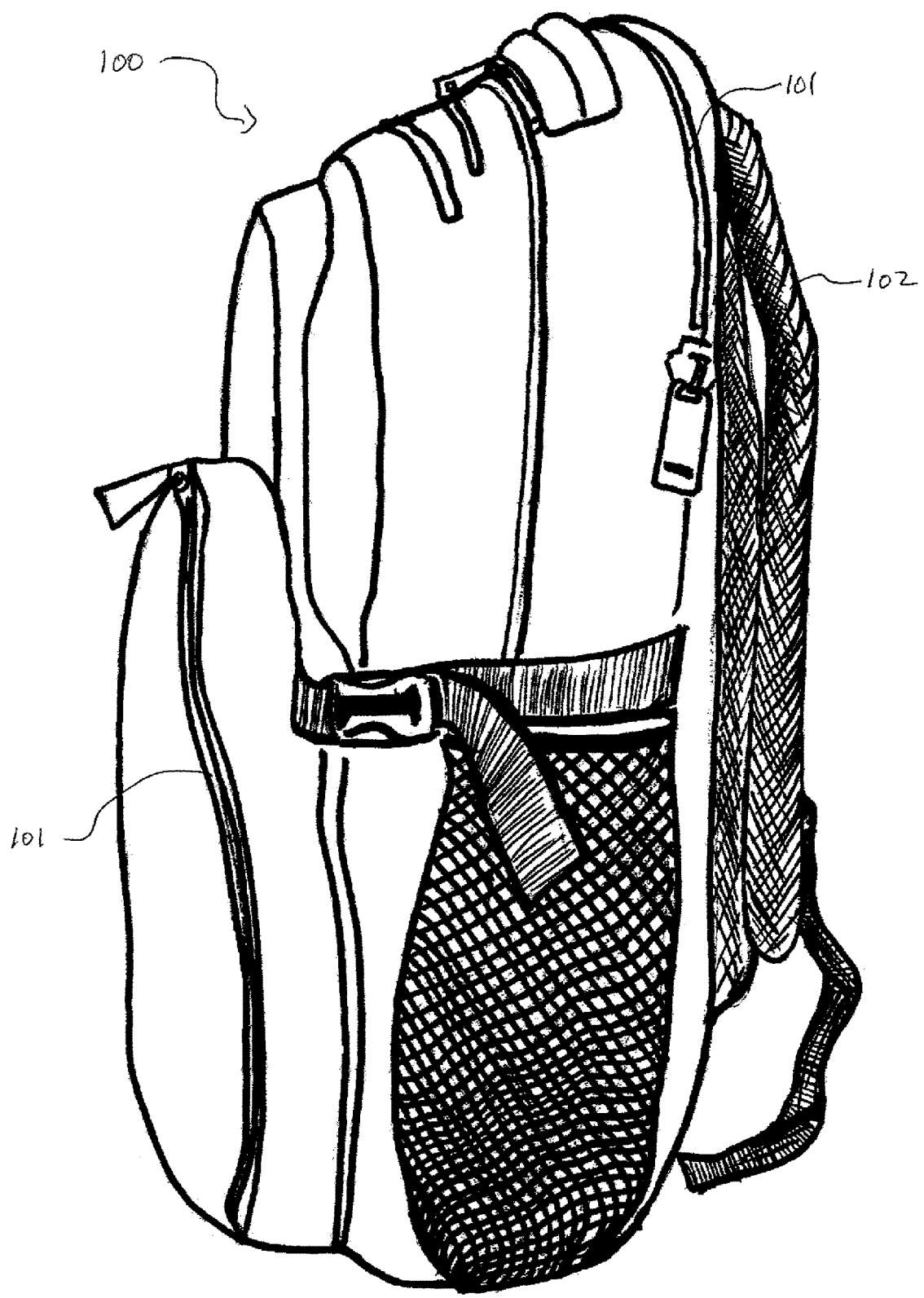
FIG. 1 illustrates a side view of a typical backpack that may enclose a child safety seating system as provided herein.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the present disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

As used herein, the terms "right" and "left" are intended to be used relative to the child while sitting the in the child safety seating system.

As used herein, the term "backpack" refers to a personal piece of portable storage equipment that is adapted to be carried by a user (e.g., on the back of a user).

As used herein, the term "child" refers to any human being subject to state or federal law or regulations regarding seat usage. Such laws and regulations may pertain to an age requirement, size requirement, weight requirement, or any combination thereof.

A portable child safety restraint system is provided. The portable child safety restraint system includes a backpack and a child safety seating system. The child safety seating system has the ability to fold into a compactible, easy, convenient carrying system that may be enclosed within or attached onto or within a typical backpack (e.g., housed within a typical backpack enclosure). The backpack may be carried on a person's back and the accompanying child safety seating system may be quickly and efficiently deployed, opened or removed from the backpack and secured onto a seat of any passenger or recreational vehicle. The child safety seating system and backpack as provided herein are lightweight and easily carried or worn by an individual until use. The backpack portion maintains typical backpack storage capabilities (i.e., multiple enclosures or compartments) while also providing a child safety seating system. The child safety seating system itself may serve as a booster seat (bottom only), high back booster seat, toddler seat, infant seat, and is easily convertible amongst each style seat in both a forward-facing and rear-facing orientation. By utilizing lightweight materials and folding functionality for the child safety seating system components provided herein, the instant child safety seating system is more compact and lightweight compared to existing child safety seating systems. The portability of the child safety restraint system as provided herein is particularly useful in an urban environment where a child may ride in car services (e.g., Uber or Lyft) that require such devices for a child.

The various child safety seating system components as provided herein may be covered in a material or fabric. Suitable materials include, but are not limited to, cotton, rayon, polyester, leather, or any combination thereof. Such suitable materials may include colors or patterns that may match or coordinate with the backpack materials to provide an aesthetically pleasing appearance. A cushioning material such as cotton or a foam may be included between the underlying components of the child safety seating system and the covering materials to provide a more comfortable seating experience for the child.

Figure 2:
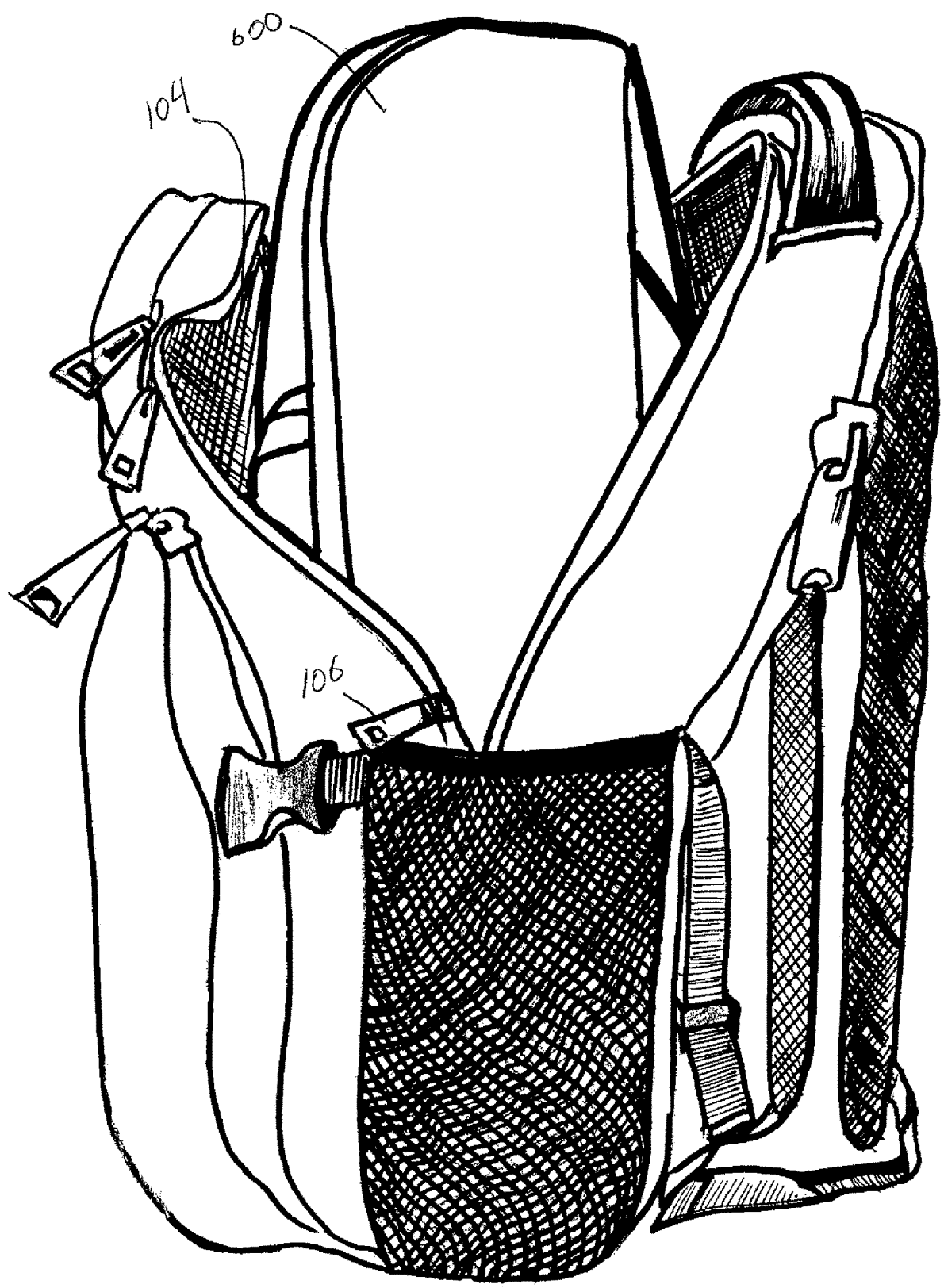
FIG. 2 illustrates a side view of one embodiment of a typical backpack that, in turn, encloses one embodiment of a child safety seating system as provided herein.

Referring to FIGS. 1 and 2, a typical backpack 100 is provided. FIG. 1 illustrates a backpack 100 in a closed position that may enclose a child safety seating system 600 (see FIG. 2) as provided herein. The backpack 100 is of any typical design and configuration that allows the child safety seating system 600 to be enclosed, secured within, attached to, hidden or tucked within the backpack 100. The backpack 100 further may include at least one or a plurality of other enclosures 101. The backpack 100 may be made from any traditional material including, but not limited to, cotton, polyester, leather, or any combination thereof. The backpack 100 includes at least one strap or loop 102 for holding the backpack 100. The backpack 100 also includes at least one closable compartment or enclosure 104. The closable compartment or enclosure 104 may include a closure means 106 such as, for example, a zipper. According to the embodiment of FIGS. 1 and 2, the child safety seating system 600 is removable from the closable compartment 104.

Figure 3:
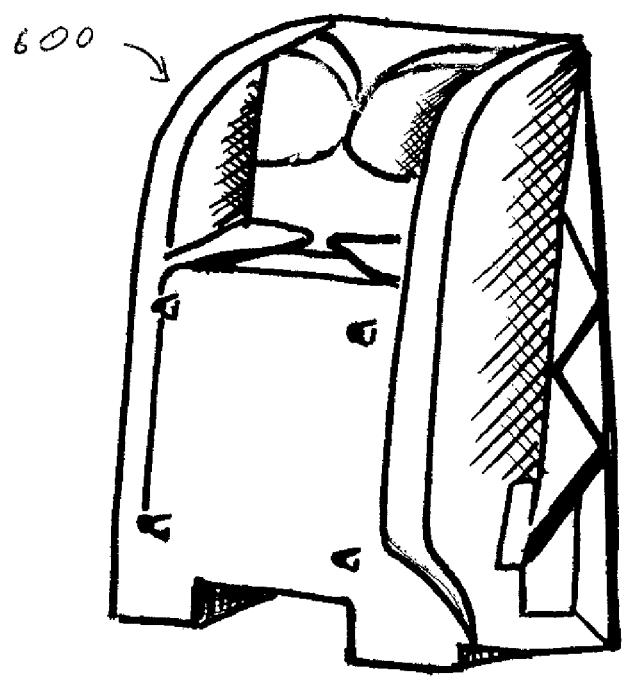
FIG. 3 illustrates a perspective view of one embodiment of a child safety seating system that may be stored in an enclosure of a backpack.

FIG. 3 illustrates one embodiment of the child safety seating system 600 in a closed position that may be stored in the backpack 100. The child safety seating system 600 may be completely separated from the backpack 100 (i.e., not a part of the backpack 100) before use.

Figure 4:
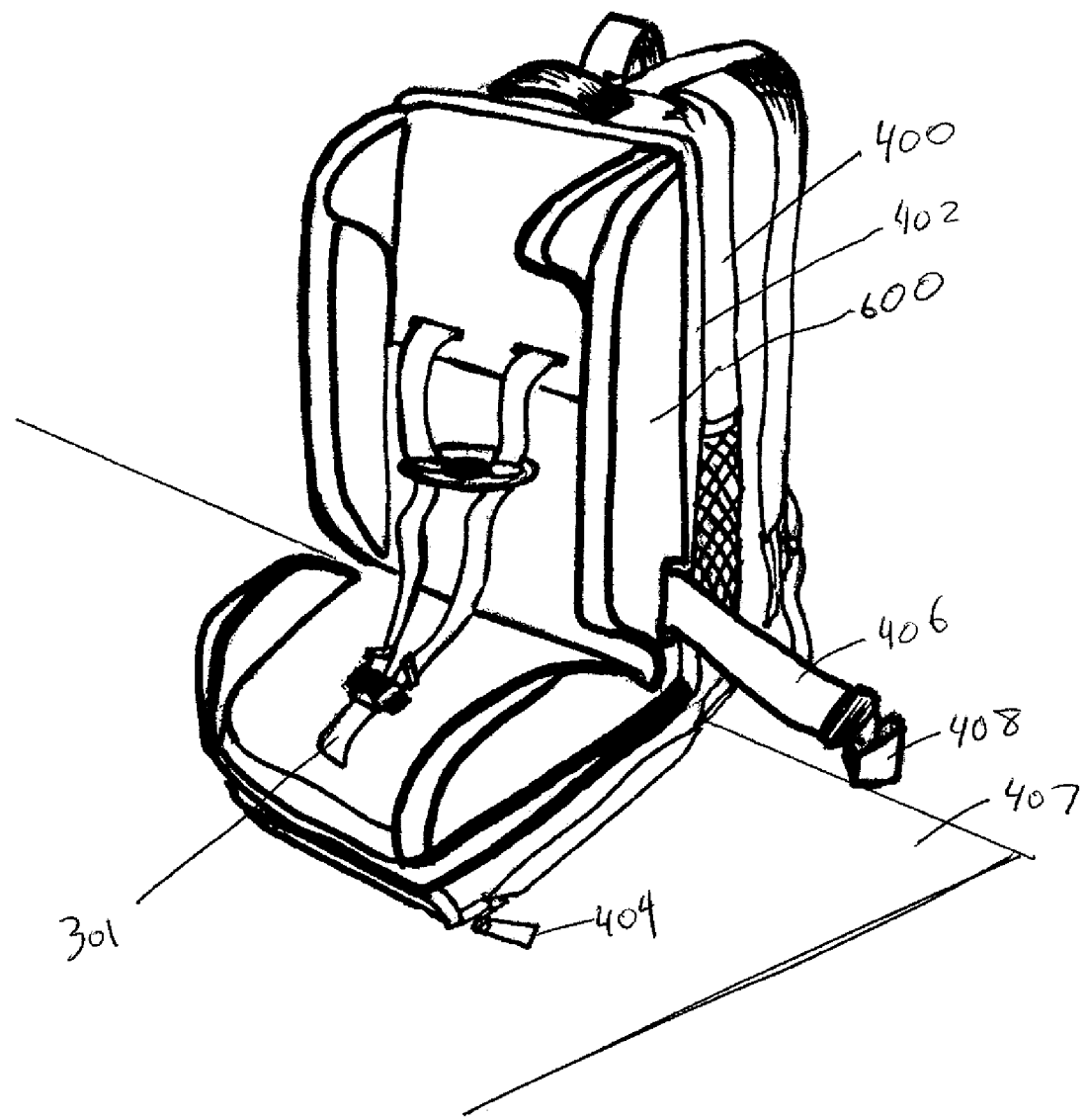
FIG. 4 illustrates a perspective view of a forward-facing embodiment of a child safety seating system that is secured within a typical backpack as illustrated in FIG. 1.

Referring to FIG. 4, a forward-facing embodiment of a child safety seating system 600 is illustrated that includes a child safety seating system 600 that is secured within a typical backpack 400. According to the illustrated embodiment of FIG. 4, the backpack 400 and child safety seating system 600 are attached together in a manner such that the child safety seating system 600 is not separate from the backpack 400 itself. According to the illustrated embodiment of FIG. 4, the forward-facing child safety seating system 600 is in an open position. The child safety seating system 600 may move from a first, closed position (not pictured) to a second, open position as illustrated in FIG. 4. The child safety seating system 600 may be included or secured within any closable compartment or enclosure 402 of the backpack 400. The closable compartment or enclosure 402 may include a closure means such as, for example, a zipper 404. The forward-facing embodiment of the child safety seating system 600 is adapted to allow at least one shoulder or lap belt 406 or an ISOFIX best (not shown) to pass through and secure the child safety seating system 600 to a seat 407 of an automobile via a typical latch 408. The forward-facing embodiment of the child safety seating system 600 meets or exceeds all National Highway and Transportation Safety Administration (NHTSA) regulations for forward-facing use.

Figure 5:
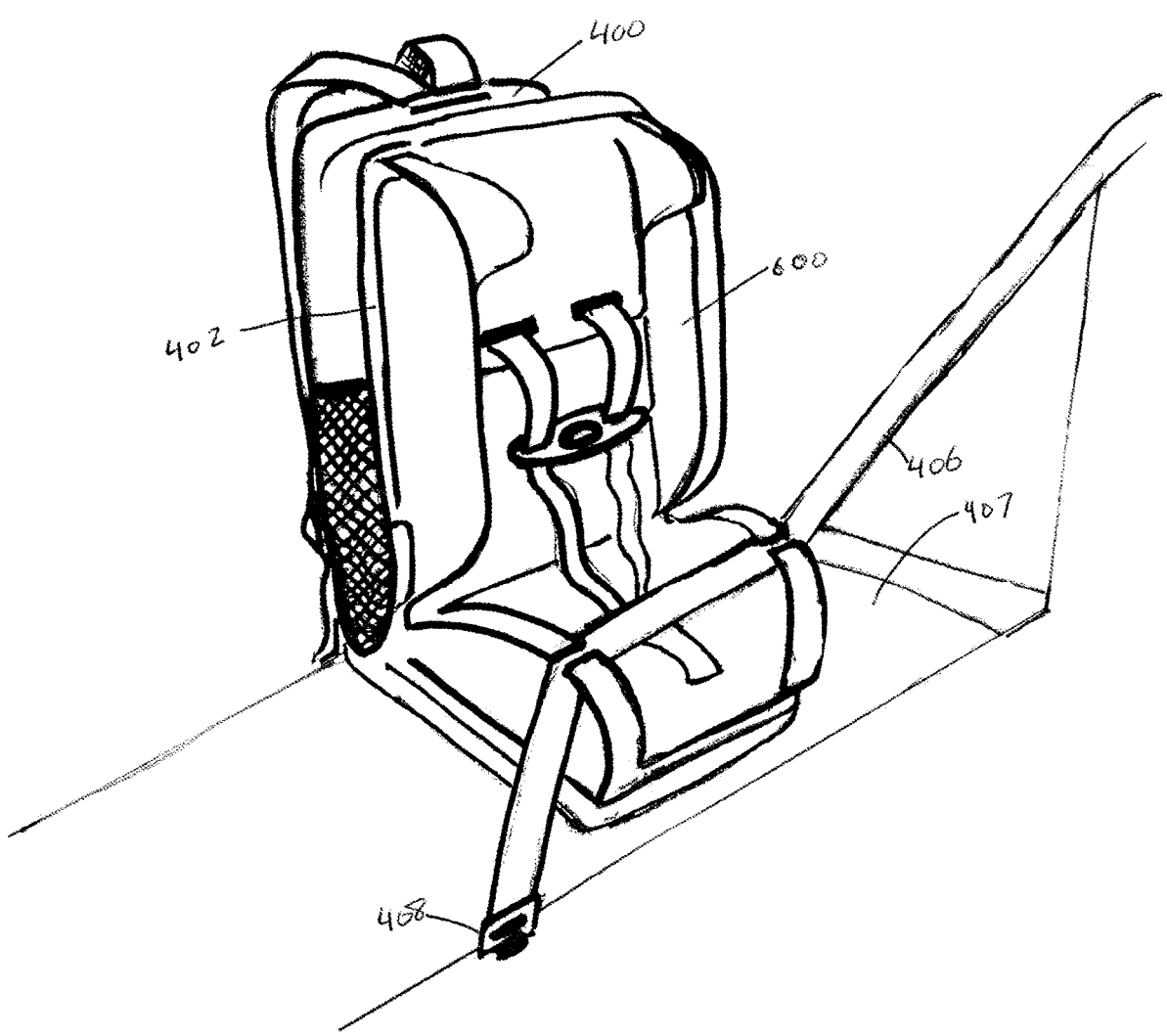
FIG. 5 illustrates a perspective view of one rear-facing embodiment of a child safety seating system that is secured within a typical backpack as illustrated in FIG. 1.

FIG. 5 illustrates a rear-facing embodiment of a child safety seating system 600. The backpack 400 and child safety seating system 600 are attached together in a manner such that the child safety seating system 600 is not separate from the backpack 400 itself. According to the illustrated embodiment of FIG. 5, the rear-facing child safety seating system 600 is in an open position. The child safety seating system 600 may move from a first, closed position (not pictured) to a second, open position as illustrated in FIG. 5. The child safety seating system 600 may be included or secured within any closable compartment or enclosure 402 of the backpack 400. The closable compartment or enclosure 402 may include a closure means such as, for example, a zipper (not shown). The rear-facing embodiment of the child safety seating system 600 is adapted to allow at least one shoulder or lap belt 406 to pass through and secure the child safety seating system 600 to a seat 407 of an automobile via a typical latch 408. The forward-facing embodiment of the child safety seating system 600 meets or exceeds all National Highway and Transportation Safety Administration (NHTSA) regulations for rear-facing use.

Referring to FIGS. 6A through 6H a child safety seating system 600 is provided. The child safety seating system 600 is shown without any fabric covering the various components. Each component included in the child safety seating system 600 may be fabricated from a variety of solid materials that meet or exceed NHTSA standards. According to one embodiment, the various components of the child safety seating system 600 are formed from a plastic that is, for example, injection molded that is thicker compared to standard seating systems thereby reducing the overall volume of the child safety seating system while still meeting or exceeding any required safety standards. According to one embodiment, the various components of the child safety seating system 600 are formed from a lightweight metal.

The child safety seating system 600 includes, in part, a head support component 602, hip support components (604, 605), seat back 606, and seat bottom 608. Referring particularly to FIGS. 6E and 6F, the shoulder supports 610 extend outwardly from the seat back 606. The shoulder supports 610 secure a child from side-to-side or horizontal movement. The seat back 606 further includes a front surface 612. The front surface 612 forms a plurality of holes or slots 614 that traverse or extend through the seat back 606. The slots 614 allow for connection to the head support component 602. When the slots 614 are formed in an oblong manner as illustrated, the slots 614 allow for vertical adjustment of the head support component 602.

Figure 6A:
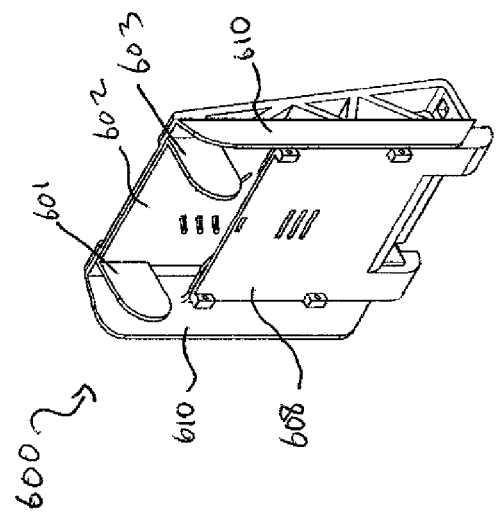
FIG. 6A illustrates a perspective view of a child safety seating system in an open position.
Figure 6B:
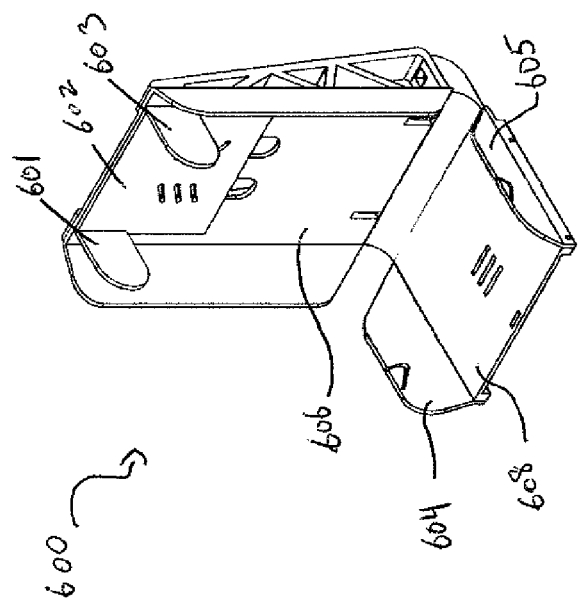
FIG. 6B illustrates a perspective view of a child safety seating system in a closed position.
Figure 6G:
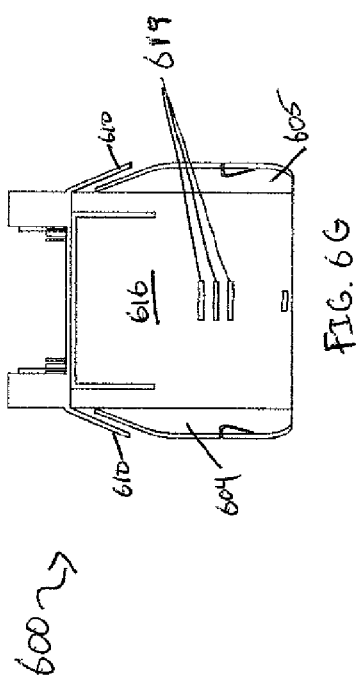
FIG. 6G illustrates a top view of a child safety seating system in an open position.
Figure 6H:
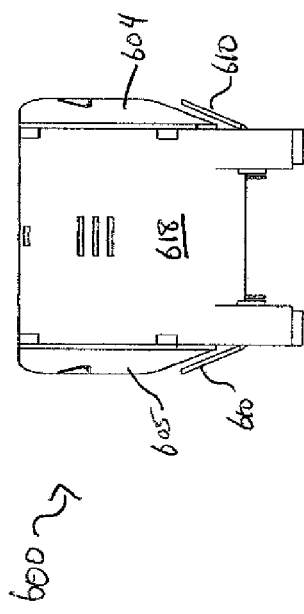
FIG. 6H illustrates a bottom view of a child safety seating system in an open position.
Figure 6B:
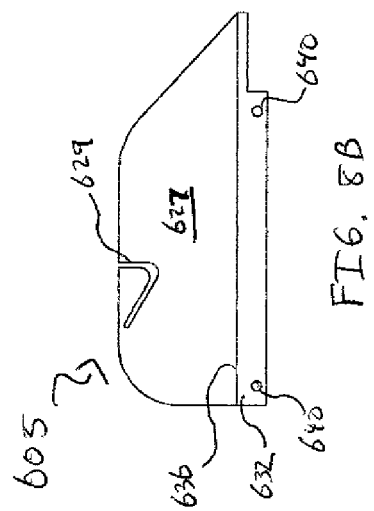
Figure 6A:
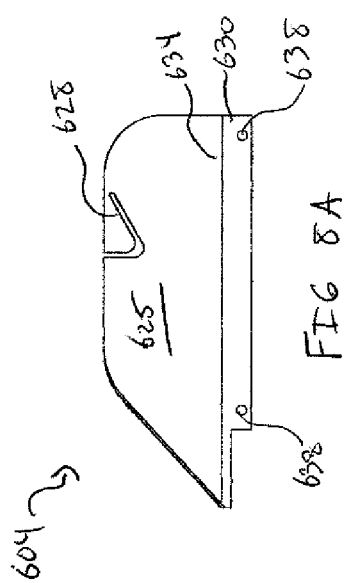

Referring particularly to FIGS. 6G and 6H, the seat bottom 608 may include a top surface 616 and bottom surface 618 through which a plurality of harness location holes or slots 618 traverse or pass through. The harness location slots 619 provide multiple locations to thread a harness depending on the size (e.g., height) of the child.

Referring to FIGS. 7A and 7B, the head support component 602 is provided. The head support component 602 includes a front surface 620 and back surface 622 through which a plurality of holes or slots 624 traverse or pass through. The head support component 602 includes at least two support flanges (601, 603) that extend outwardly from the front surface 620 to provide side-to-side support for a child's head.

Referring to FIGS. 8A and 8B, each of the right and left hip support components (604, 605) include a surface (625, 627) defining a belt guide slot (628, 629). The belt guide slots (628, 629) are horizontally aligned such that a safety belt may be engaged in each belt guide slot (628, 629) and pulled across a child's lap. The belt guide slots (628, 629) are utilized when the child safety seating system 600 is utilized in a rear-facing manner (see FIG. 5). The belt guide slots (628, 629) are substantially "J" shaped, however, the belt guide slot may also be substantially horizontal such that the belt is substantially flat across a child's lap when a belt is in use. The right and left hip support components (604, 605) also each include a latch portion (630, 632). The latch portions (630, 632) are located on a lower, side portion (634, 636) of each of the right and left hip support components (604, 605). The latch portions (630, 632) allow for attachment of the right and left hip support components (604, 605) to the left and right sides of the seat bottom 608. The latch portions (630, 632) may include a plurality of holes or slots (638, 640) that traverses of pass entirely though the hinge portions (630, 632). The holes or slots (638, 640) may be adapted to receive a fastener (not shown) that passes through the holes or slots (638, 640) and through holes or slots 691 in the seat bottom 608 to secure the right and left hip support components (604, 605) to a right and left latch component (670, 672) located on a right and left side of the seat bottom 608 (See FIG. 100 as well as FIGS. 11A-110).

Figure 9C:
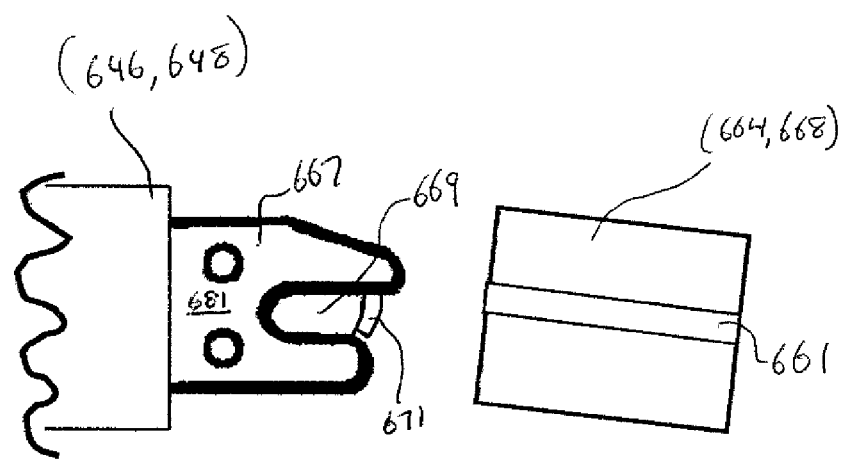
FIG. 9C illustrates one embodiment of a locking component and latch system for securing a seat back to a seat bottom.
Figure 9D:
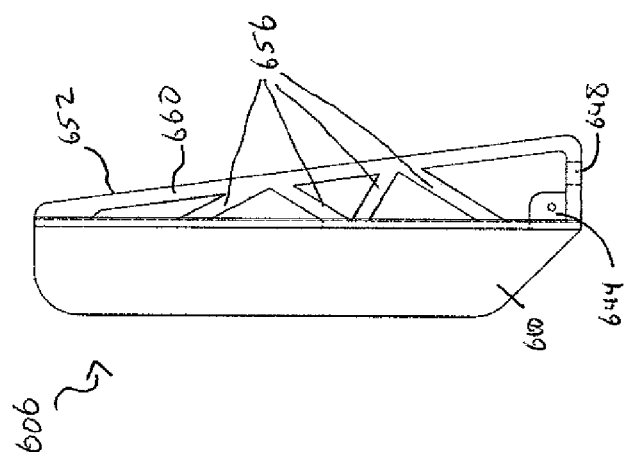
FIG. 9D illustrates a left side view of a seat back component.
Figure 9E:
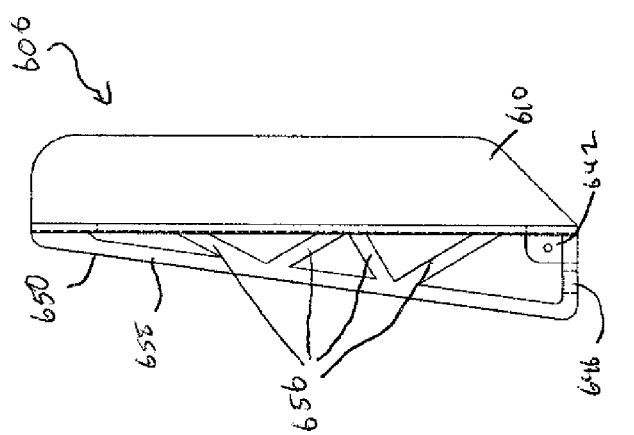
FIG. 9E illustrates a right side view of a seat back component.

Referring to FIGS. 9A and 9B, the top and bottom views of the seat back 606 is provided. The seat back 606 includes a first and second female hinge (642, 644). The first and second female hinge (642, 644) provide a mechanism by which a first and second male hinge component (663, 665)(see FIG. 10A) may engage and provide a means for rotating the seat bottom 608 upward or seat back 606 downward so that the child safety seating system 600 moves from an open to closed position and vice versa. Such means for rotating allows the child safety seating system 600 to become compact, portable, and adapted to fit on or within a backpack as provided herein. The seat back 606 includes a right male latch component 646 and a left male latch component 648. The right and left male latch components (646, 648) provide a connection mechanism for the seat back 606 to the seat bottom 608. According to a particular embodiment as illustrated in FIG. 9C, the right and left male latch components (646, 648) form a locking component 667 having a surface 681 defining a transversely extending slot 669 through which a bracket 661 in a female latch component (664, 668) located on the seat bottom 608 can be inserted. The locking component 667 may also include at least one tooth 671 that is movable inward from a first, closed position (as illustrated) to an second, open position such that the bracket 661 move up and within the slot 669 there by allowing the at least one tooth 671 to move back outward to a first, closed position. Such a configuration may be found in an ISOFIX latch. The bracket 661 may be made of a metal such as stainless steel.

Referring to FIGS. 9D to 9G, a right and left side view of the seat back 606 are provided. The seat back may include a right and left back support (650, 652). The right and left back support (650, 652) provide additional strength and support to the seat back 606. The right and left back support (650, 652) are also formed at an angle that substantially matches the back seat portion of a car to provide a comfortable angle of support for the child's back. The right and left back support (650, 652) may be include a one or a plurality of legs or trusses 656 that extend from the seat back 606 and support a right and left angled support leg (658, 660). When utilized as a forward-facing child safety seating system, a safety belt (lap, shoulder, or combination thereof), may be threaded through the trusses 656 to secure the child safety seating system 600 to the seat of the vehicle.

Referring to FIGS. 10A to 10G, the seat bottom 608 may include a top surface 616 and bottom surface 618 through which a harness adjustment slot 662 traverses or pass thorough. The harness adjustment slot 662 allows for the harness 301 (see FIG. 4) to be tightened or loosened based on the size of the child. The seat bottom further includes a first and second male hinge components (663, 665) that extend upward and provide a connection mechanism for the seat bottom 608 to connect to the seat back 606. The male hinge components (663, 665) may attach to the corresponding female hinge components (642, 644) of the seat bottom 608 via at least one fastener (not shown) that secures the male hinge components (663, 665) and female hinge components (642, 644) to one another.

Referring specifically to FIG. 10B, the seat bottom 608 includes a right female latch component 664 and left female latch component 668. The female latch components (664, 668) engage or otherwise secure the right and left male latch components (646, 648) of the seat back 606. According to one embodiment and as illustrated in FIG. 9C, the female latch components (664, 668) may engage or otherwise secure the right and left male latch components (646, 648) of the seat back 606 in an ISOFIX latch system as typically found in belt latches for securing typical car seats to car seats.

Figure 11C:
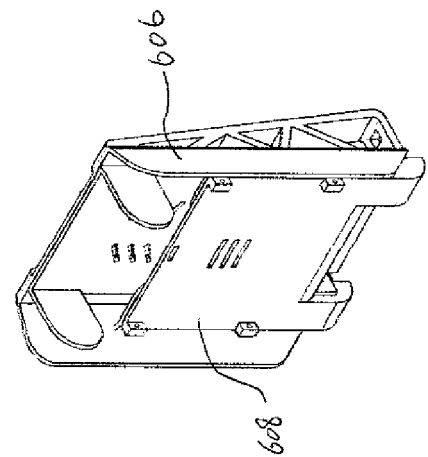
FIG. 11C illustrates a perspective view of a child safety seating system as provided herein in a closed position with the hip support components in a closed position and the seat bottom folded up.
Figure 11B:
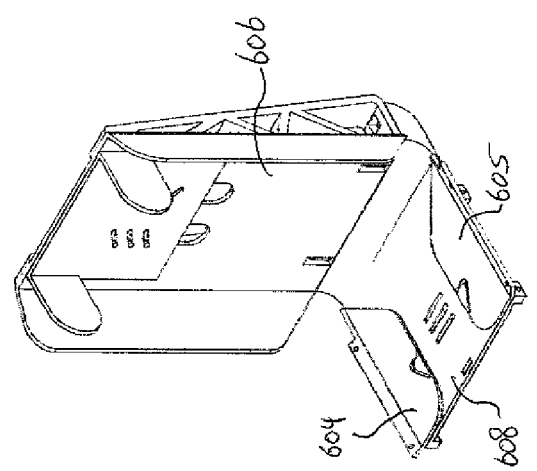
FIG. 11B illustrates a perspective view of a child safety seating system as provided herein with the hip support components in a closed position.
Figure 11A:
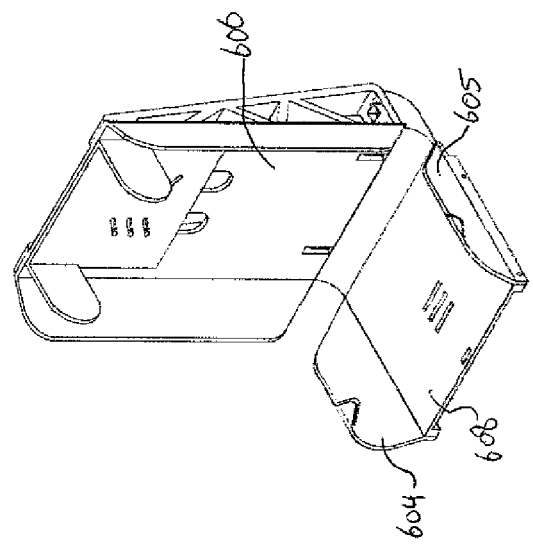
FIG. 11A illustrates a perspective view of a child safety seating system as provided herein with the hip support components in an open position.

Referring specifically to FIG. 10O as well as FIGS. 11A-11C, a right and left latch component (670, 672) are located on a right and left side of the seat bottom 608 and align with the latch portions (630, 632) of the right and left hip support components (604, 605)(see FIGS. 8A and 8B). According to one embodiment, these latch portions ((670, 672) and (630, 632)) allow movement of the right and left hip support components (604, 605) such that the right and left hip support components (604, 605) are movable or rotatable from first, open position (FIG. 11A) to a second, closed position (FIG. 11B). The second, closed position (FIG. 11B) is utilized for folding the seat bottom (608) into the seat back (602)(See FIG. 11C). According to a particular embodiment, the latch portions ((670, 672) and (630, 632)) are spring loaded relative to each other such that the right and left hip support components (604, 605) are movable or rotatable from first, open position (FIG. 11A) to a second, closed position (FIG. 11B) for folding into the seat back (602)(See FIG. 11C).

FIG. 12 illustrates the front right corner of a particular embodiment of a child safety seating system 600. A rod 700 traverses the hole or slot 640 in the latch 632 of the hip support component 605 and hole or slot 691 in the latch 672 of the seat bottom 608. A spring 702 is attached to or around the rod 700. A terminal component 704 maintains the spring 702 on the rod 700 and between the terminal component 704 and seat bottom latch 672. The opposing end 701 of the rod 700 includes two ramps or ears 706. The ramps 706 keep the opposing end 701 of the rod 700 from sliding back through the holes or slots (640 and 691) when the rod 700 is rotated 90 degrees such that the ramps 706 rest against the latch 632 of the hip support component 605.

To use the child safety restraint system as provided herein that includes a separate seating system, a user may simply remove the seating system from the backpack and deploy the system in a back seat of a vehicle. To use the child safety restraint system as provided herein that includes a seating system that is permanent secured to or within an enclosure, a user may simply unzip or unbuckle the respective enclosure housing the seating system and deploy the system in a back seat of a vehicle.

The seating systems may be deployed by lowering the seat bottom to transition the seating systems from a closed position to an open position. The child may then be placed in the seat and secured in any harness. If utilized as a forward-facing manner, the back seat safety belt may be weaved through the seat back trusses and secured in a back seat latch. If utilized in a rear-facing manner, the back seat safety belt may be weaved through the belt guides on the hip supports and secured in a back seat latch.

According to another aspect, a method of securing a child in a portable child safety restraint system is provided. The method includes the steps of providing a portable child safety restraint system as provided herein, removing the child safety seating system from the backpack or opening a backpack enclosure that stores the child safety seating system, lowering the seat bottom from a closed position to an open position, opening each of a left and right hip support components rotateably attached to the seat bottom, introducing the child to the child safety seating system, and adjusting any harness system present in the child safety seating system.

According to another aspect, a method of porting in a portable child safety restraint system is provided. The method includes the steps of providing a portable child safety restraint system as provided herein, removing any child seated in the child safety seating system, folding in the left and right hip support components rotateably attached to the seat bottom, and raising the seat bottom from an open position to a closed position. According to one embodiment, the child safety seating system is attached to a backpack enclosure or compartment. According to such an embodiment, the corresponding enclosure or compartment is simply secured shut (e.g., via zipper or button). According to an alternative embodiment, the child safety seating system is entirely separate from a backpack and may simply be placed inside an enclosure or compartment of a backpack.

Although specific embodiments of the present invention are herein illustrated and described in detail, the invention is not limited thereto. The above detailed descriptions are provided as exemplary of the present invention and should not be construed as constituting any limitation of the invention. Modifications will be obvious to those skilled in the art, and all modifications that do not depart from the spirit of the invention are intended to be included with the scope of the appended claims.

We claim:

1. A portable passenger or recreational vehicle child safety restraint system comprising:
   a backpack comprising a plurality of enclosures; and
   a child safety seating system, the child safety seating system comprising:
      a seat bottom, the seat bottom including a left hip support component, a right hip support component, a first male hinge component, and second male hinge component;
      a seat back, the seat back including a first female hinge component and a second female hinge component; and a head support component that includes a right and left support flange to support a child's head, wherein each of the first male hinge component and second male hinge component of the seat bottom connects via a fastener to the first female hinge component and second female hinge component of the seat back, respectively, such that the seat bottom is rotatable about the hinge components and fasteners between a first, open seating position and a second closed position against the seat back, wherein when the seat bottom is in the closed position, the child safety system is capable of being stored within at least one of the backpack enclosures, wherein the child safety seating system is configured to be secured onto a seat of a passenger or recreational vehicle, and wherein the child safety seating system includes at least one belt guide on the left hip and at least one belt guide on the right hip support, each belt guide adapted to receive a seat safety belt located in the passenger or recreational vehicle for securing the portable child safety seating system to the vehicle seat in a rear-facing orientation thereby resulting in a portable child safety seating system that is convertible between a rear-facing orientation and forward-facing orientation.

2. The portable child safety restraint system of claim 1, wherein the seat back includes a front surface and back surface defining a plurality of slots.

3. The portable child safety restraint system of claim 1, wherein the head support component further comprises a front and back surface that define a plurality of slots that traverse the head support.

4. The portable child safety restraint system of claim 1, wherein the plurality of enclosures is opened or closed via at least one zipper.

5. The portable child safety restraint system of claim 1, wherein the backpack includes one or more straps for holding the entire portable child safety restraint system.

6. The portable child safety restraint system of claim 1, wherein the child safety seating system is entirely removable from the at least one of the plurality of backpack enclosures.

7. The portable child safety restraint system of claim 1, wherein the child safety seating system is permanently secured to at least one enclosure of the backpack.

8. A method of securing a child in a portable child safety restraint system comprising the steps of:

providing a portable child safety restraint system comprising:
  a backpack comprising a plurality of enclosures; and
  a child safety seating system, the child safety seating system comprising:
    a seat bottom, the seat bottom including a left hip support component, a right hip support component, a first male hinge component, and second male hinge component;
    a seat back, the seat back including a first female hinge component and a second female hinge component; and
    a head support component that includes a right and left support flange to support a child's head, wherein the child safety seating system is entirely removable from the backpack or permanently secured to or within at least one enclosure of the backpack;

removing the child safety seating system from the backpack or opening a backpack enclosure that stores the child safety seating system;

lowering the seat bottom from a closed position to an open position;

opening each of a left and right hip support components rotatably attached to the seat bottom;

introducing the child to the child safety seating system; and adjusting any harness system present in the child safety seating system.

\* \* \* \* \*